July 23, 1940.   J. B. DEARING   2,209,191
RADIO NAVIGATION DEVICE
Filed Oct. 12, 1937   4 Sheets-Sheet 3
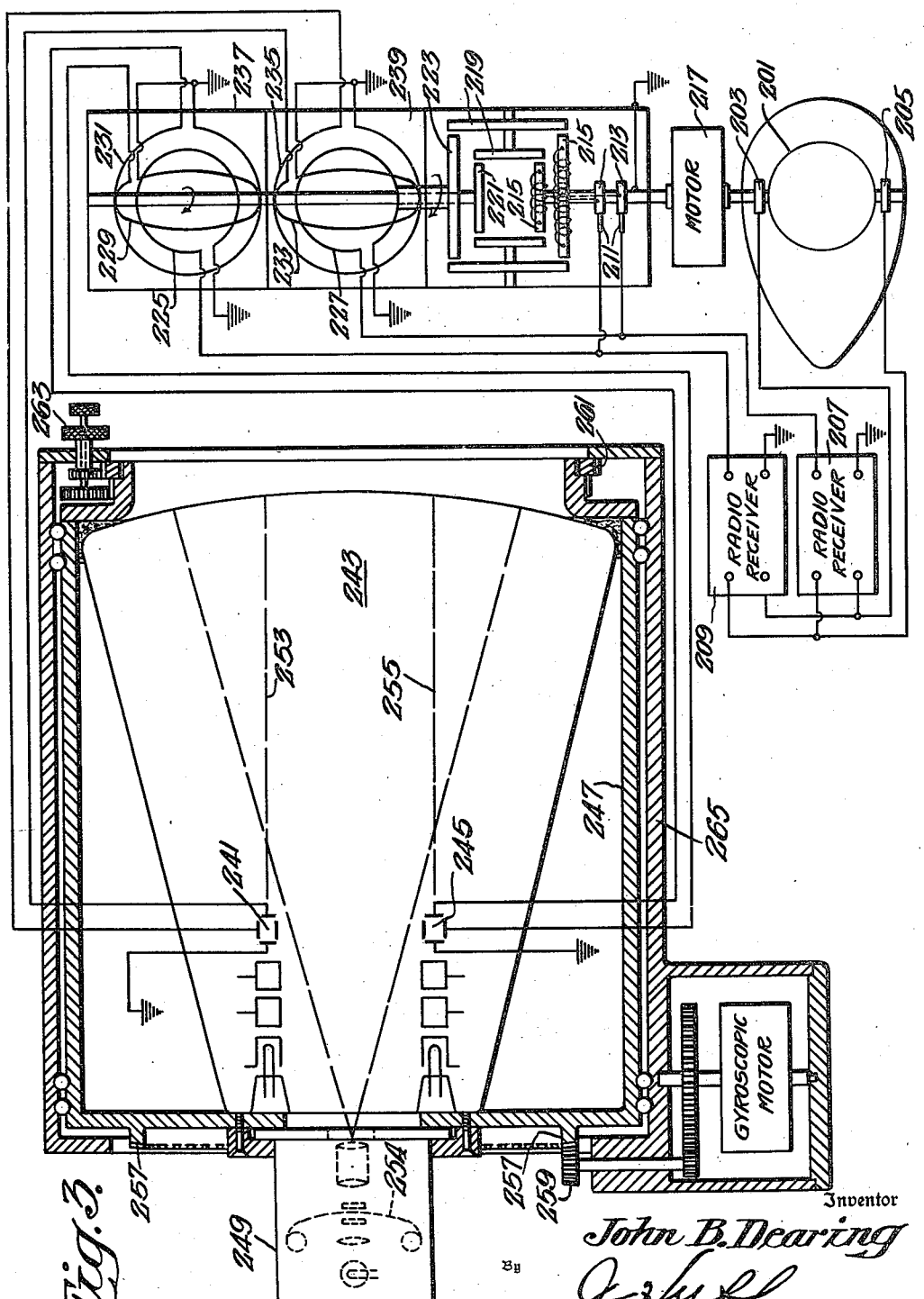

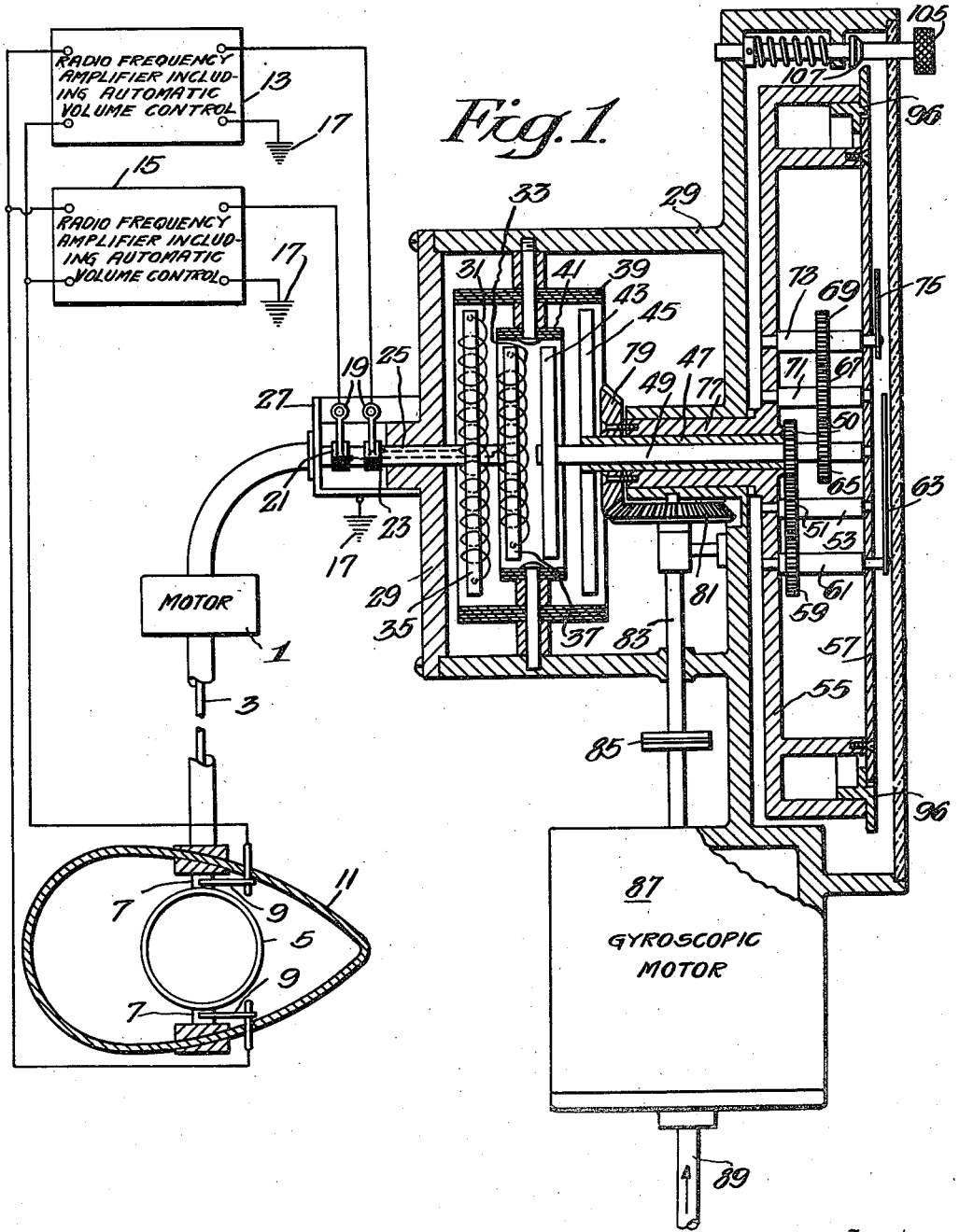

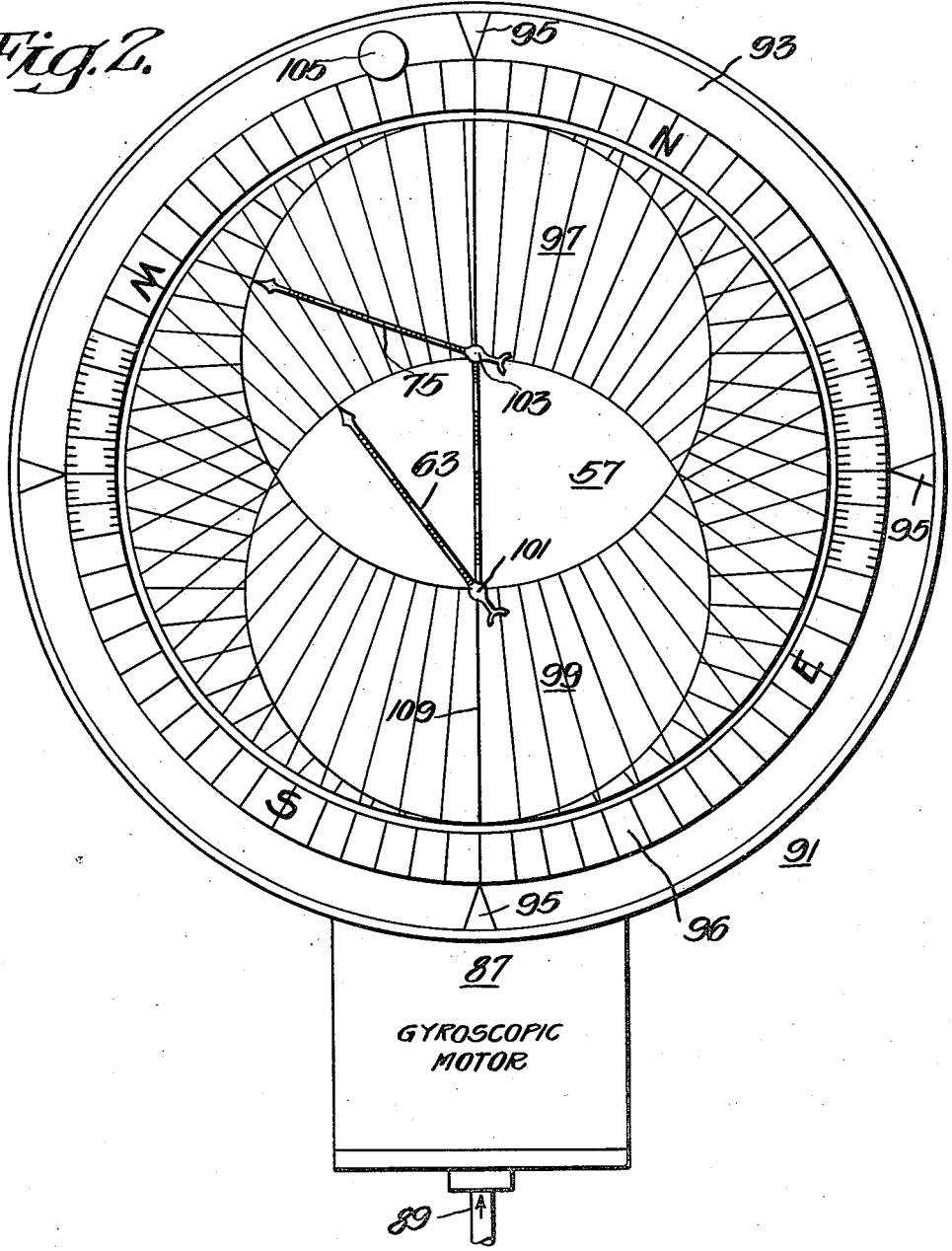

July 23, 1940.   J. B. DEARING   2,209,191
RADIO NAVIGATION DEVICE
Filed Oct. 12, 1937   4 Sheets-Sheet 4
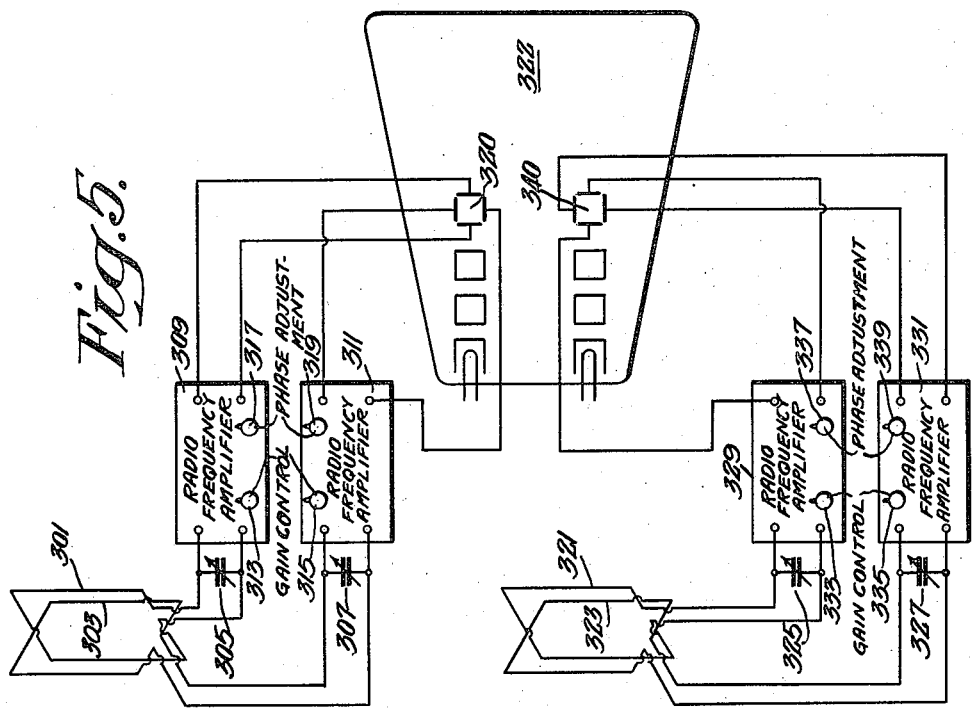
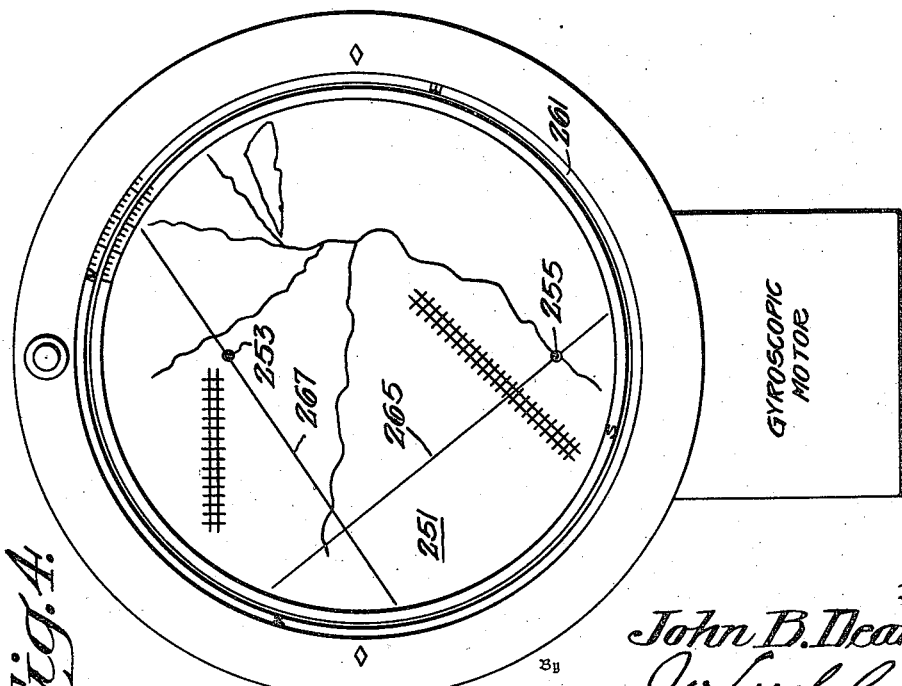
Inventor
John B. Dearing
Attorney Patented July 23, 1940

2,209,191

UNITED STATES PATENT OFFICE 2,209,191

RADIO NAVIGATION DEVICE

John B. Dearing, Ben Avon, Pa., assignor to Radio Corporation of America, a corporation of Delaware Application October 12, 1937, Serial No. 168,537

4 Claims. (Cl. 250—11)

My invention relates to radio navigation, and particularly to apparatus for continuously indicating the position of a moving aircraft with respect to one or more radio transmitters and the cardinal compass points.

One of the difficulties of aerial navigation, when the visibility is low, is the present practice of employing a plurality of different instruments to convey the required information to the navigator. For example, an aircraft may carry a magnetic compass, a gyro-compass, a radio "left-right" course indicator, or an aural course indicator, an altimeter, and in some cases a radio direction finder. In navigating during low visibility, it is generally necessary for the pilot of an aircraft to coordinate the indication of several of the foregoing instruments and from this information calculate the position of his craft. My invention contemplates an automatic and continuous indication of the position of the aircraft with respect to known points.

One of the objects of my invention is to provide means for automatically indicating the position of an aircraft.

Another object is to provide means for automatically and continuously indicating to the operator of an aircraft the position of his craft with respect to known points.

A further object is to provide means for combining a radio compass bearing indication with a gyro-compass indication.

A still further object is to provide means for continuously indicating the position of an aircraft in motion with respect to a pair of known points and to maintain the indicated orientation of these points with respect to the compass points.

A further object of my invention is to provide means for indicating the position in a vertical plane with respect to ground points of an aircraft in motion to facilitate landing under adverse visibility conditions.

My invention will be described by reference to the accompanying drawings in which Figure 1 is a schematic diagram, partly in section, of one embodiment of my invention, Figure 2 is an elevational view of an indicating dial embodied in my invention, Figures 3 and 4 illustrate an embodiment of my invention employing a cathode ray tube as an indicator, and Figure 5 is a schematic diagram of a further modification of my invention.

Referring to Fig. 1, a motor 1 is coupled through a flexible shaft 3 to a rotatable loop antenna 5. The terminals of the loop are connected to slip rings 7. Brushes 9 contact the slip rings. The entire loop may be mounted within a streamlined housing 11. The brushes 9 are connected to the input circuits of a pair of tunable radio frequency amplifiers 13, 15. The amplifiers preferably include automatic volume control circuits from which output currents may be derived. Since the radio frequency amplifiers and automatic volume control are not per se my invention, and since they are well known to those skilled in the art, no detailed description is necessary.

The output currents from the automatic volume control circuits of the amplifiers are conveyed through ground connections 17, and brushes 19 to a pair of commutators 21, 23. The commutators are each arranged to make contact during 180° of revolution, and are insulated during the next 180° for reasons which will be hereinafter set forth. The motor 1 is also connected through a flexible shaft to a shaft 25 which is mounted on suitable bearings in the housing 27, 29. The commutators 21, 23 are mounted on the shaft 25 and are connected by leads which extend through the shaft to armature windings 31, 33. The armature windings 31, 33 are mounted on the rotating armatures 35, 37. The rotating armatures are fastened to the shaft 25 and are rotated in synchronism with the loop 5.

A pair of hollow cylindrical elements 39—41 of magnetizable material are fixedly mounted within the housing 29. These elements are preferably made of laminated iron and arranged so that the flux from the rotating armatures 35, 37 will be conveyed through the elements 39, 41 to a pair of rotatable armatures 45, 43. One of the rotatable armatures 45 is mounted on one end of a hollow shaft 47. The other rotatable armature 43 is mounted on a shaft 49 which has for its bearing the hollow portion of the shaft 47.

A gear 50 is mounted on the end of the hollow shaft 47. The gear 50 engages an idler gear 51 which is mounted on a shaft 53. The shaft 53 has bearings in a movable head 55 and an indicator plate 57. The idler gear 51 is engaged by a gear 59 which is mounted on a shaft 61 which also has bearings in the movable head 55 and indicator plate 57. The shaft 61 extends through the plate 57 and has mounted on its end a pointer 63.

A gear 65 is mounted on the end of the inner shaft 49. This gear 65 engages an idler gear 67. The idler gear 67 engages a gear 69. The last mentioned gears 67, 69 are respectively carried by shafts 71, 73 which have bearings in the movable head 55 and the indicator plate 57. A pointer 75 is secured to the end of the shaft 73 which projects through the indicator plate. The several gear train ratios are such that the pointers 63, 75 will move the same amount as the rotatable armatures 43, 45 to which they are respectively connected.

The movable head 55 is provided with a hollow shaft 77. The shaft 77 is carried by a bearing in the housing 29. The hollow portion of the movable head shaft 77 becomes the bearing for the shafts 47, 49, which are connected to the rotatable armatures. A bevel gear 79 is suitably mounted on the end of the hollow shaft 77 remote from the head 55. A second bevel gear 81, supported by a shaft 83, engages the bevel gear 79. The shaft 83 is coupled through a friction clutch 85 to a gyroscope motor which is housed within the case 87. The gyro mechanism may be driven by compressed air as indicated by the pipe 89. The gyro motor may be any one of a number of types well known to those skilled in the art and therefore requiring no detailed description. It should be understood that, each of the several shafts are provided with suitable thrust bearings to prevent end play.

Reference will be made to both Figs. 1 and 2 for further details of the indicator head and compass card. Similar reference numerals will be applied to indicate similar elements. The dial 91 of the navigating instrument includes an outer rim 93 which is stationary. Convenient reference marks 95 are included in the rim 93. The outer portion 96 of the indicator plate 57 is adjustably mounted with respect to the movable head 55, and the indicator plate proper. This outer portion 96 is divided into degrees and marked N, E, S and W to correspond to a conventional compass card. The indicator plate is marked by two sets of radial lines 97, 99. One of these sets of radial lines 97 is drawn toward the center 101 about which the pointer 63 rotates. The other set of radial lines 99 is drawn toward the center 103 about which the pointer 75 rotates.

The compass card portion 96 of the indicator plate 57 is adjustable both with respect to the centers 101, 103 and with respect to the gyro-motor. The former adjustment is effected by an adjusting screw 105. A small disc 107 is secured to the adjusting screw and arranged so that the outer portion of the compass card 96 may be frictionally engaged and rotated when the clutch 85 is prevented from rotating. The latter adjustment is effected by simply moving the upper portion of the clutch 85 with respect to the lower portion whereby the entire indicating plate may be moved with respect to the gyro-motor.

The operation of the apparatus is as follows: For a given flight the navigator selects two radio transmitters of known location. A line through these transmitters will have a known compass bearing. The centers 101, 103 correspond to the transmitters. A line 109 through the centers 101, 103 is oriented with respect to the compass card 96 to thereby correspond to the compass bearing of the line through the transmitters, for example, 30° west of north. In the instant example, it is assumed that the line of flight is parallel to the line 109. With the aircraft headed 30° west of north, the desired line of flight, the gyro-motor is adjusted to maintain the compass card as described. If the craft heads to the right or left of the desired course, the gyro-compass card 96 will immediately indicate the departure.

It will be observed that the movement of the aircraft which rotates the housing 29 with respect to the indicator plate 57 and compass card 96 will not affect the positions of the pointers 63, 75 with respect to the plate 57, for the pointers are arranged to have movements which depend only on the bearing of the transmitters, and the orientation of the plate 57 is maintained by the gyroscopic motor. These movements are controlled as follows: The loop 5 will have a characteristic figure 8 response pattern. The minimum response is obtained when the plane of the loop is parallel to the front of the waves transmitted from the selected radio stations. The radio frequency amplifiers 13, 15 are respectively tuned to the frequency of the waves from the transmitters. At the instant of minimum loop response the automatic volume control circuits will have maximum response to bring the radio frequency amplifiers to maximum sensitivity. The output currents from the automatic volume control circuits are impressed on the brushes 19.

The brushes 19 engage the commutators 21, 23 during one half revolution to prevent two responses due to the two minimums of the loop. The response points are arranged to give the loop "sense" as well as direction. The same effect may be secured with a cardioid pattern. The currents applied to the commutators are impressed on the windings 31, 33 of the rotating armatures 35, 37 which are moving in synchronism with the loop. The currents through the windings set up magnetic fluxes in the armatures, and from the armatures to and through the magnetizable elements 39—41. These fluxes are sufficient to move the rotatable armatures 45, 43 into positions which correspond respectively with the positions in which the maximum flux is established in each of the rotating armatures 35, 37. Thus the armatures 43, 45 are maintained in positions which correspond to the bearings of the radio transmitters as determined by the loop 5.

Since the pointers 63 and 75 are respectively coupled to the armatures 45, 43 the pointers will likewise assume positions corresponding to the bearings of the radio transmitters. The intersection of the pointer indications will be the location of the aircraft with respect to the base line, the transmitters and the compass indication. As the aircraft proceeds along its desired line of flight the pointers will continuously indicate the position of the craft with respect to the radio transmitters. Thus the navigator may follow the flight by observing the single instrument.

An embodiment of my invention which employs a cathode ray tube as a bearing indicator is shown in Figs. 3 and 4. In describing these figures similar reference numerals will be applied to similar elements. A rotating loop antenna 201 is connected through slip rings 203, 205 to the input circuits of radio receivers 207, 209. The receivers include automatic volume control networks from which currents may be derived when the null points of response are obtained from the rotating loop 201. The derived currents are impressed through brushes 211 on the commutators 213. The commutators are connected to windings on the rotating armatures 215. The armatures 215. The armatures 215, commutators 213, and loop 201 and its commutators 203, 205 are all rotated in synchronism by a motor 217.

The armatures 215 rotate within magnetizable rings 219, which transmit the magnetic flux from the rotating armatures to independently rotatable armatures 221, 223. The rotatable armatures are respectively coupled to movable coils 225, 227, which are in turn connected to the receiver output circuits. The movable coils 225, 227 are arranged so that they may be coupled respectively to pairs of fixed coils 229, 231 and 233, 235. The pairs of fixed coils are arranged at right angles and are positioned within shielded compartments 237, 239.

One of the sets of fixed coils 229, 231 is connected to the deflecting electrodes 245 of a dual cathode ray tube 243. The other set of fixed coils 233, 235 is connected to a second set of deflecting electrodes 241, which are also included within the cathode ray tube 243. Each of the sets of deflecting electrodes are part of the conventional electron guns, control electrodes, anodes, etc. of a cathode ray tube. Instead of employing a dual type of cathode ray tube, a single tube may be used with switching means whereby the rays are alternately focused and deflected as described in the copending application of Vladimir K. Zworykin, Serial No. 165,454, filed September 24, 1937, now Patent 2,183,634 issued December 19, 1939, and entitled Radio course indicator.

The cathode ray tube 243 is mounted within a housing 247. A projector 249 is rotatably mounted on the rear of the housing 247. The projector is arranged to project an image of a map 251 on the screen of the cathode ray tube. The film 254 from which the map is projected may be arranged in a roll so that the map be removed along as the aircraft carrying the apparatus proceeds along its designated flight. The projected map is focused, adjusted in size and oriented so that the locations of the radio transmitters which furnish bearing signals may be made to align with the steady focus of the cathode rays 253, 255 on the fluorescent screen of the cathode ray tube.

A ring gear 257 is secured to the rear portion of the housing 247. A gear 259, which is suitably coupled to a gyroscopic motor, engages the ring gear 257. The gyroscopic motor is operated to maintain the housing 247 in a desired relation to the compass bearing. A ring 261, which is adjustably secured to the front portion of the housing 247, is suitably marked to indicate the cardinal points of the compass.

Adjusting screws 263 are arranged to move the ring 261 and housing with respect to each other and to suitably orient the compass and map indications with respect to the gyroscope. The housing 247 is designed to rotate within a casing 265. Suitable ball or roller bearings may be interposed between the casing and the housing.

The operation of the present embodiment of my invention is as follows: The rotating loop produces null or minimum responses when its plane is parallel to the wave fronts radiated from one or more radio transmitters to which the receivers 207, 209 are tuned. The output currents from the automatic volume controls of the receivers establish maximum flux in each of the rotating armatures 215 at the instantaneous positions corresponding to the loop minimums. The rotatable armatures 221, 223 will adopt the positions at which the maximum flux is transmitted to them. The movable coils 225, 227 because they are mechanically coupled to the rotatable armatures will assume positions corresponding to the rotatable armature positions.

The movable coils 225, 227 are respectively coupled to the sets of fixed coils 229, 231 and 233, 235. Therefore, electromotive forces in the movable coils 225, 227 will induce currents in the fixed coils 229, 231 and 233, 235 to which they are respectively coupled. The ratio of the currents or potentials in the fixed coils will depend upon the coupling but the phase will be either 0° or 180°. Therefore, deflecting potentials will be applied to the deflecting electrodes 241 and to the deflecting electrodes 245. Since the deflecting potentials applied to either set are in phase or 180° out of phase, the deflections of the cathode rays will be, in each case, a straight line 265, 267 through the centers 253, 255. The slopes of the lines 265, 267 will be a function of the ratios of the applied potentials. Because the ratios of potentials ultimately depend on the bearings of the transmitters, the lines will indicate the bearing of the transmitters, and the intersection of the lines the location of the aircraft carrying the device.

In some installations the use of rotating parts may be objectionable. For such installations I have shown, in Fig. 5, a modification of my invention which employs fixed directional antennas in place of a rotating loop. A first pair of loops 301, 303 are arranged at right angles and tuned by variable capacitors 305, 307. The tuned loops are respectively connected to pairs of identical radio frequency amplifiers 309, 311. The amplifiers are preferably tuned and include gain controls 313, 315 and phase adjusting controls 317, 319. The output circuits of the amplifiers are connected to the deflecting electrodes 320 of a dual cathode ray tube 322.

A second pair of loops 321, 323 are arranged at right angles and tuned by variable capacitors 325, 327. The thus tuned loops are respectively connected to a second pair of identical amplifiers 329, 331. The amplifiers are preferably tuned and include gain controls 333, 335 and phase adjusting controls 337, 339. The output circuits of the second pair of amplifiers 329, 331 are connected to the second set of deflecting electrodes 340 of the dual cathode ray tube 322.

The cathode ray tube 322 may be incorporated in a housing with or without gyro compass control and map projecting means previously described. The operation of the instant system is substantially the same as the arrangement illustrated by Fig. 3. In the circuit of Fig. 5 the loops 301, 303 are made resonant to the carrier from a transmitter of known location. The second pair of loops 321, 323 are made resonant to the carrier of a second transmitter preferably about fifty miles from the first transmitter. The resonant currents in each loop of the respective pairs of crossed loops will be in phase but the ratio of the currents will vary as the bearing between the loops and the transmitter varies.

If the amplifiers have uniform gain and the no phase shift the amplified currents applied to the deflecting electrodes 320, 340 will deflect the cathode rays along straight lines. The slope of the lines will be determined by the ratio of the applied potentials which are, of course, determined by the disposition of the crossed loops with respect to the transmitter to which they are tuned. The intersection of the cathode ray traces on the fluorescent screen will indicate the location of a craft carrying the loops with respect to the transmitters.

It is important that the gain in each amplifier of each pair of amplifiers be the same. If the gain should vary, the ratio of output currents would vary and a false bearing line would result. The gain may be readily checked by applying the same input potential to each amplifier, and if a cathode ray trace with a 45° slope is observed the gains will be uniform. A phase change will be readily indicated by the cathode ray trace opening up to form an elipse or a circle. The phase may be adjusted to close the elipse and obtain a single straight line deflection.

One very satisfactory method of navigation with the apparatus I have described is to select broadcasting stations, conveniently located along the line of flight, and operate in accordance with the indications from such stations. It should be understood that as the craft proceeds beyond the useful range of one or both transmitters, the apparatus is adjusted with respect to other transmitters. If the indicator is to be used to effect a landing during adverse visibility, a pair of ground transmitters are operated on or near the landing field runway. The loop is rotated about a horizontal axis to indicate the position of the aircraft with respect to the base line joining the transmitters. The crossed cathode ray traces or pointer intersections will indicate the approach of the craft to the runway. In place of a single loop and indicator a pair of loops and indicators may be used to indicate both horizontal and vertical positions. Of course, a pair of loops arranged with vertical and horizontal rotational means may be used with suitable switches which connect the loops to a single indicator.

In operating over definite airways, for example, New York City to Washington, D. C., a series of stations separated by fifty mile intervals could be arranged along the line between these cities. A pilot flying to Washington could maintain his course a few miles to one side of the line, and a pilot bound on the opposite course could fly along the other side of the line to avoid collisions. With stations definitely located, at fifty mile intervals, the space between the pointers could correspond to fifty miles, and thereby indicate the mileage between the craft and the base line. It is also contemplated that maps corresponding to each fifty mile interval could be projected on the indicator plate to make it unnecessary for the navigator to refer his bearing to a map.

It should be understood that I do not limit my invention to a rotating loop but may use well known equivalents such as a goniometer with fixed loops, and a rotating pickup coil, or a combination of vertical antenna and loop or goniometer, or dipole antennas with or without reflectors. Likewise the radio receivers may be tunable radio frequency amplifiers, superheterodyne receivers, and may incorporate detectors, automatic volume control and similar systems. In a similar manner the gyro motor may be operated electrically, by compressed air or any suitable form of energy. I have described the projection of a map on the indicator plate. The map may be a transparent drawing arranged in a roll or other convenient form or may be optically projected on the indicator plate.

Thus I have described a radio navigation device in which a compass indication and a pair of radio bearing indications are combined to continuously indicate the position of a moving aircraft. The radio bearings are indicated by a pair of pointers whose intersection indicates the position of the craft with respect to a pair of radio transmitters. The compass indication is controlled by a gyroscopic compass.

I claim as my invention:

1. A radio navigation device including in combination, means for indicating the bearing of a radio transmitter, means for indicating the compass bearing, said first mentioned indication being effected by a cathode ray tube and said second mentioned indication being effected by a compass card surrounding the screen of said cathode ray tube, and a gyroscopic motor coupled to said radio bearing indicator and to said compass bearing indicator so that variations of the latter are automatically applied to the former.

2. In a radio navigation device for a mobile craft means including a cathode ray tube for indicating the bearing of a radio transmitter, additional means including said cathode ray tube for indicating the bearing of a second radio transmitter whereby different bearing indications will intersect and the intersections of said indications will indicate the location of said device with respect to said stations, means for projecting the image of a map including the location of said transmitters through said cathode ray tube and on its screen, and automatic means for orienting continuously said cathode ray tube and projection means as a function of an earth meridian and thus independent of the heading of a vehicle carrying such device.

3. In a device of the character of claim 2, a compass card mounted adjacent the indicating portion of said cathode ray tube and movable in synchronism with said tube by said automatic orienting means, and means for orienting said card with respect to the compass bearing and maintaining said orientation.

4. In a radio navigation device for a mobile craft means including a cathode ray tube for indicating the bearing of a radio transmitter, additional means including said cathode ray tube for indicating the bearing of a second radio transmitter whereby different bearing indications will intersect and the intersections of said indications will indicate the location of said device with respect to said transmitters, a compass card mounted adjacent the indicating portion of said cathode ray tube and moved in synchronism therewith, means for orienting said card with respect to the compass bearing and maintaining said orientation and a gyroscopic motor for orienting automatically said cathode ray tube and said compass card as a function of the compass heading of a craft carrying said device so that said location indication is independent of the heading of said craft.

JOHN B. DEARING.